(12) United States Patent
Piirainen

(10) Patent No.: US 6,748,035 B2
(45) Date of Patent: *Jun. 8, 2004

(54) METHOD FOR DETERMINING CONNECTION QUALITY, AND A RECEIVER

(75) Inventor: Olli Piirainen, Oulu (FI)

(73) Assignee: Nokia Corporation, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,962

(22) PCT Filed: Aug. 11, 1997

(86) PCT No.: PCT/FI97/00472
§ 371 (c)(1),
(2), (4) Date: Feb. 4, 1999

(87) PCT Pub. No.: WO98/07240
PCT Pub. Date: Feb. 19, 1998

(65) Prior Publication Data
US 2003/0123578 A1 Jul. 3, 2003

(30) Foreign Application Priority Data
Aug. 9, 1996 (FI) .................................................. 963137

(51) Int. Cl.⁷ .......................... H03D 1/00; H04L 27/06
(52) U.S. Cl. ........................................ 375/341; 375/262
(58) Field of Search ............................... 375/241, 229, 375/262, 265, 224, 227; 714/780, 792, 794, 795, 796

(56) References Cited

U.S. PATENT DOCUMENTS

| | | | | |
|---|---|---|---|---|
| 5,144,644 A | * | 9/1992 | Borth | 375/341 |
| 5,303,263 A | * | 4/1994 | Shoji et al. | 375/229 |
| 5,375,129 A | * | 12/1994 | Cooper | 714/795 |
| 5,502,735 A | | 3/1996 | Cooper | |
| 5,511,081 A | * | 4/1996 | Hagenauer | 714/795 |
| 5,519,727 A | * | 5/1996 | Okanoue et al. | 375/232 |

FOREIGN PATENT DOCUMENTS

| | | | |
|---|---|---|---|
| EP | 0 302 330 | 2/1989 | |
| EP | 0 430 413 | 6/1991 | |
| EP | 0 430 413 A2 * | 6/1991 | ........... H04L/25/30 |
| WO | WO 96/26583 | 8/1996 | |

OTHER PUBLICATIONS

A photocopy of the International Search Report for PCT/FI97/00472.

* cited by examiner

Primary Examiner—Jean B. Corrielus
(74) Attorney, Agent, or Firm—Squire, Sanders & Dempsey L.L.P.

(57) ABSTRACT

The invention relates to a method for determining connection quality, and a receiver in a radio system, the receiver comprising means for decoding a received signal by the Viterbi method by means of a trellis diagram comprising a group of state points, and means for calculating state transition values for the two possible transitions in each point of the diagram. To determine advantageously the quality of the connection between a transmitter and the receiver, the inventive receiver comprises means for calculating, in each column of the trellis diagram, the maximum values for both the transitions of the points in the column, for determining the absolute value of the difference of the calculated maximum values, and means for estimating connection quality by utilizing said absolute value.

5 Claims, 3 Drawing Sheets

METHOD FOR DETERMINING CONNECTION QUALITY, AND A RECEIVER

This application is a 371 of PCT/FI97/00472 filed on Aug. 11, 1997.

FIELD OF THE INVENTION

The present invention relates to a method for estimating connection quality in a receiver of a radio system, the method comprising decoding a received signal with a Viterbi decoder by utilizing a trellis diagram comprising a group of state points, a transition being possible from each point of the diagram to two points in the next column, and state transition values being calculated for the transitions.

PRIOR ART

In a cellular radio system, the quality of the connection between a base station and a subscriber terminal varies continuously. This variation is caused by disturbances on the radio path and the attenuation of radio waves as a function of distance. For example, when a subscriber terminal moves further away from the base station, attenuation on the connection between the subscriber terminal and the base station increases. Often, an attempt is made to compensate for this attenuation by power control.

Power measurement alone will not, however, suffice as a parameter indicating the connection quality. A variable often employed in digital cellular radio systems to express connection quality is the bit error rate (BER), which represents the number of erroneously received bits compared to all the received bits. In the GSM cellular radio system, for example, the base station and the subscriber terminal are continuously measuring the BER on the connection between them. The measurement results are transferred to a base station controller, which on the basis of the measurements makes, if need be, the decision to hand the connection over to a channel offering better connection quality.

It is necessary to measure the connection quality as accurately as possible so as to be able to use the resources of the cellular radio system optimally and to minimize the number of poor connections. Consequently, the measurement period for the BER measurement in the GSM system is 480 milliseconds, which corresponds to 104 TDMA timeslots in a full-rate channel and 52 TDMA timeslots in a half-rate channel.

It is previously known to estimate the BER of a channel as a so-called pseudober measurement. In this method, the BER is estimated by coding anew the signal at the output of the channel decoder comprised by the receiver, and by counting the number of correct bits. However, this method is not the best possible because it is not guaranteed that the channel decoder always corrects an erroneous bit. The channel decoder may also change a correct bit into an incorrect bit. In addition, the accuracy of the method depends on the length of the bit sequence being treated. The bit sequence, i.e. the measurement period, should be long enough so that the BER could be detected correctly also when erroneous bits occur seldom in the channel. In the GSM system, this is a problem particularly in a half-rate channel, in which the number of bits is lower than in a full-rate channel. Further, the pseudober method is heavy to carry out by a signal processor.

Another prior art method for estimating the BER is to calculate it from the known training sequence of each traffic channel during the measurement period. Since in the GSM system there are 26 bits in the training sequence, and a half-rate channel has 52 frames on each traffic channel during the measurement period, there are consequently only 52*26 known bits from which to calculate the BER. This is too few for calculating a BER estimate accurately enough.

CHARACTERISTICS OF THE INVENTION

It is therefore an object of the invention to implement a method for estimating the quality of a connection, which is simple and accurate and does not require heavy computation. It is a further object of the invention to implement a receiver in which monitoring of the connection quality is easy to implement in connection with the decoding process.

This is achieved by a method of the type set forth in the introduction, characterized by calculating, in each column of the trellis diagram, the maximum values for both the transitions of the points in the column, and by determining the absolute value of the difference of the calculated maximum values, and by utilizing said absolute value in determining the connection quality.

The invention further relates to a receiver in a radio system, the receiver comprising means for decoding a received signal by the Viterbi method by means of a trellis diagram comprising a group of state points, and means for calculating state transition values for the two possible transitions in each point of the diagram. The receiver according to the invention is characterized by comprising means for calculating, in each column of the trellis diagram, the maximum values for both the transitions of the points in the column, for determining the absolute value of the difference of the calculated maximum values, and means for estimating connection quality by utilizing said absolute value.

The inventive solution provides a number of advantages. It may be implemented in a simple manner, e.g. by an ASIC circuit, and it does not require memory. When implemented in connection with Viterbi logic, the necessary computation may be executed in parallel with carrying out the Viterbi. Further, the inventive method is even more accurate than the previously known methods.

DESCRIPTION OF THE DRAWINGS

In the following, the invention will be described in closer detail with reference to the examples in the accompanying drawings, in which.

DESCRIPTION OF THE PREFERRED EMBODIMENTS

Figure 1:
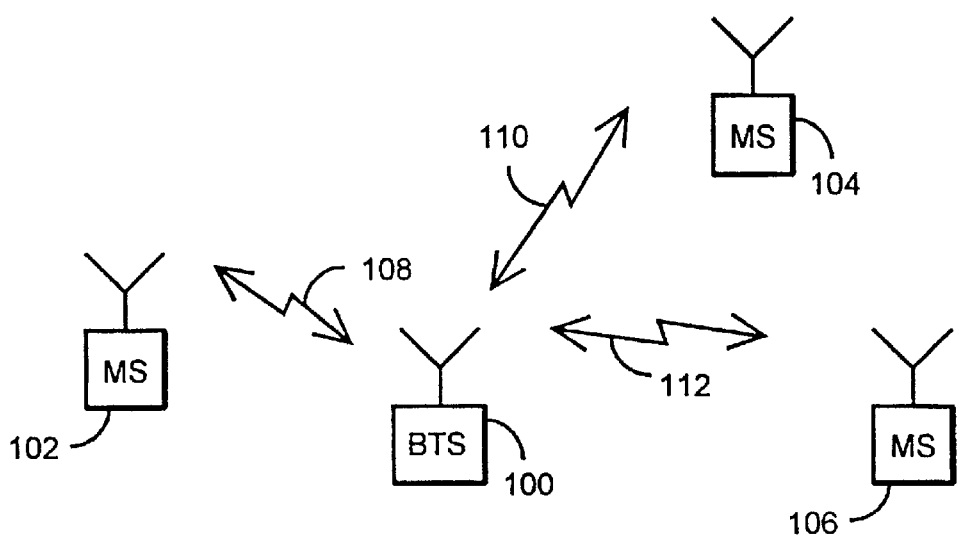
FIG. 1 shows an example of a radio system in which the invention may be applied.

The method and receiver according to the invention may be applied in any digital radio system. FIG. 1 shows by way of example the essential parts of the structure of a typical cellular radio system. The system comprises a base station 100, and a group of usually mobile subscriber terminals 102–104 that have a two-way connection 106–108 to the base station 100. The base station 100 forwards the connections of the terminals 102–104 to other parts of the system and to the fixed network.

Figure 2:
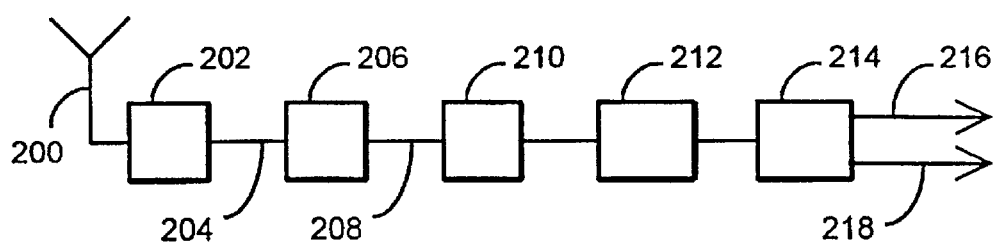
FIG. 2 illustrates an example of the structure of the receiver according to the invention.

The following will examine an example of the structure of the inventive receiver, illustrated by the block diagram of FIG. 2. The receiver comprises an antenna 200 which receives a signal to be applied to radio frequency parts 202. The radio frequency parts convert the received signal into an intermediate frequency. The converted signal 204 is further applied to sampling means 206 in which the signal is converted from analog to digital form. The digitized signal 208 is further applied to an equalizer 210. In the equalizer, the distortion caused by the transmission channel, i.e. the radio path, to the signal is corrected. From the equalizer, the signal is fed to deinterleaving means 212 which deinterleave the bits interleaved at the transmitting stage. Interleaving is commonly used in digital transfer systems. It should be noted that the method according to the invention may also be applied to systems in which interleaving is not employed. All the receiver components mentioned above may be implemented in ways known by persons skilled in the art.

The symbols received from the deinterleaving means 212 are fed to a convolution decoder 214 which makes hard decisions from the symbols. A decoded burst 216 and information on the reliability 218 of the decision are present at the output of the decoder 214. The convolution decoder is usually implemented by means of the Viterbi algorithm. In the Viterbi algorithm, soft decision may be utilized although this is not essential as far as the present invention is concerned.

Figure 3:
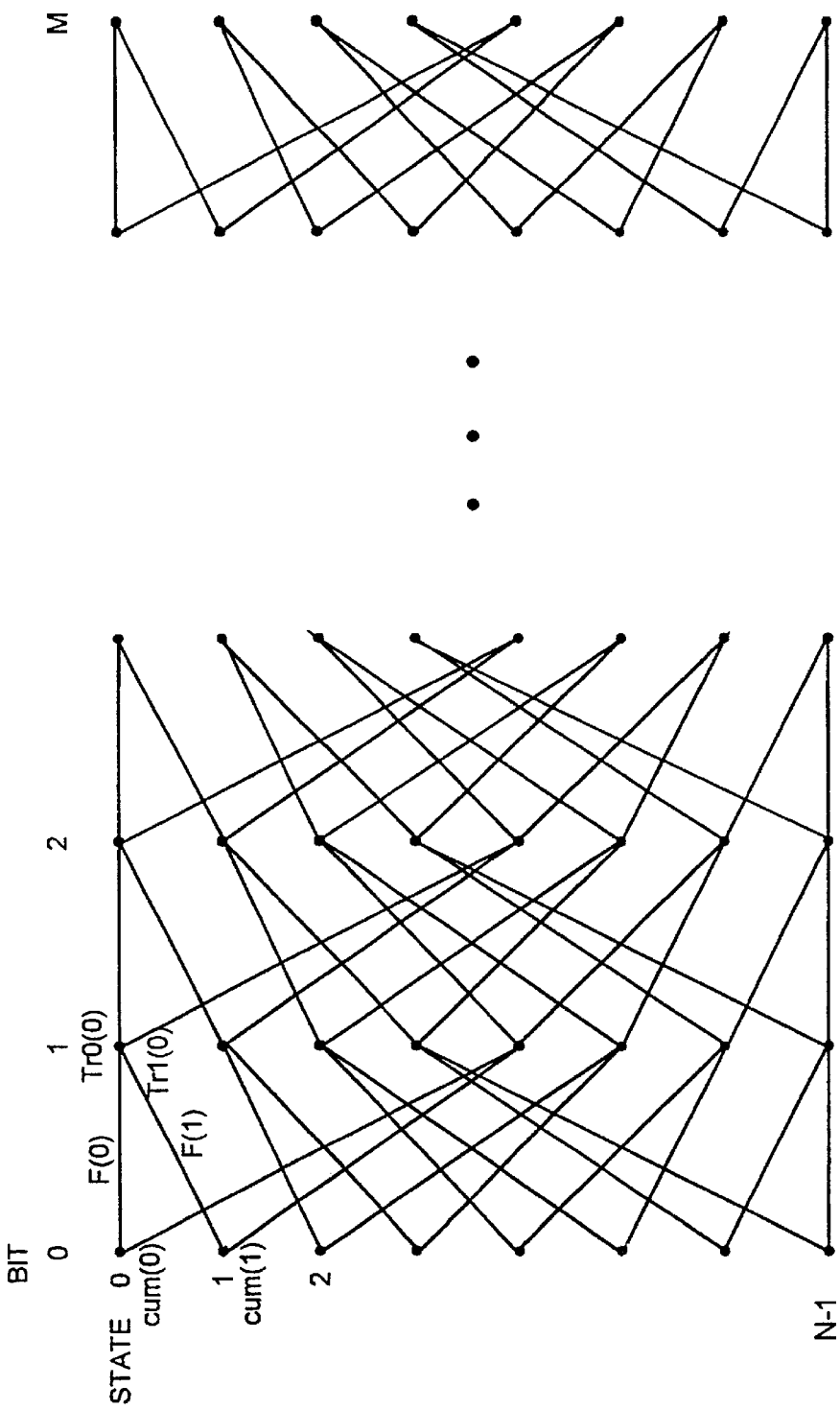
FIG. 3 shows an example of a trellis diagram used in a Viterbi decoder.

In the following, the operation of the Viterbi algorithm will be examined. FIG. 3 illustrates a typical trellis diagram, used in connection with the Viterbi algorithm. When solving the Viterbi algorithm, the process proceeds in the trellis diagram from left to right. The size of the trellis diagram is determined so that it has N rows, where N is the number of possible states, and M+1 columns, where M represents the number of bits. Each point of the diagram may be entered via two different routes, i.e. from two points in the previous column.

Thus, there are two possible transitions to each point. The first transition Tr1 represents a transition of bit 1 and the other that of bit 0. The transitions are formed by adding the metrics of the current received bit transition (F) to the cumulative metric value cum(.).

$$Tr0(j)=cum(2*j)+F(2*j);$$

$$Tr1(j)=cum(2*j+1)+F(2*j+1).$$

The Tr0(j) and Tr1(j) calculated with the above formulas represent the logarithm of the probability of the path through trellis ending to this particular point j. The cumulative metrics cum in a trellis point may be considered to represent the logarithm for the probability through the trellis ending in the point in question in the previous column. The F values represent the logarithm of the probability of the current bit transition, taking into account the state of the trellis (i.e. the previous bits). The highest value of state transition in each point corresponds to the state transitions in the next column when calculating the cumulative metrics of the point in question.

When calculated with the formulas above, metric values can be obtained that maximize the metrics when calculating the trellis. The trellis may also be implemented by minimizing error probability. This in not described in this example, but the invention is also applicable to it.

The following describes the inventive method for determining connection quality by means of the above state transition values. The state transition values Tr0 and Tr1 are calculated in each point of the trellis diagram. The trellis diagram is examined column by column. In each column, maximum values $Tr0_{max}$ and $Tr1_{max}$ are defined for the state transition values Tr0 and Tr1 of the column points. In other words, the most probable path ending to bit value 1 in the point in the column in question, and correspondingly the most probable path ending to bit value 0 are searched. In this manner, it is possible to estimate the reliability of the decision made between the bits 0 and 1 by calculating the absolute value of the difference of the maximum values:

$$d=|Tr1_{max}-Tr0_{max}|.$$

The variable above is associated with one bit, and thus its reliability is not the best possible. A more reliable value may be obtained by defining the sum of said absolute value over several columns, i.e. bits, and by utilizing this sum in determining the connection quality. This may be presented as $$D = \sum_{i=st}^{end} |\max(Tr1(j)) - \max(Tr0(j))|,$$

where j=state number, j=0,1, . . . , N−1,
  st=start bit (column) number
  end=end bit (column) number.

By means of a number thus calculated it is possible to estimate the reliability of the received signal frame in a reliable manner.

In the following, the structure of the inventive receiver will be examined, as illustrated by the block diagram of FIG. 2. The inventive receiver comprises means 214 for calculating in each column of the trellis diagram the maximum values $Tr0_{max}$ and $Tr1_{max}$ for both the transitions of the points in the column, for defining the absolute value of the difference of the calculated maximum values, and for utilizing said absolute value in determining connection quality. Utilizing the determined absolute value, the means (214) detect possible bad signal frames, and in order to obtain a more reliable result define said absolute value over more than one column, and utilize this sum in determining the connection quality.

In a solution according to the preferred embodiment of the invention, the calculation is carried out in the convolutional decoder 214 in connection with calculating the Viterbi. The inventive convolutional decoder may be implemented advantageously by means of software with the aid of a signal or a general processor or separate components.

Figure 4:
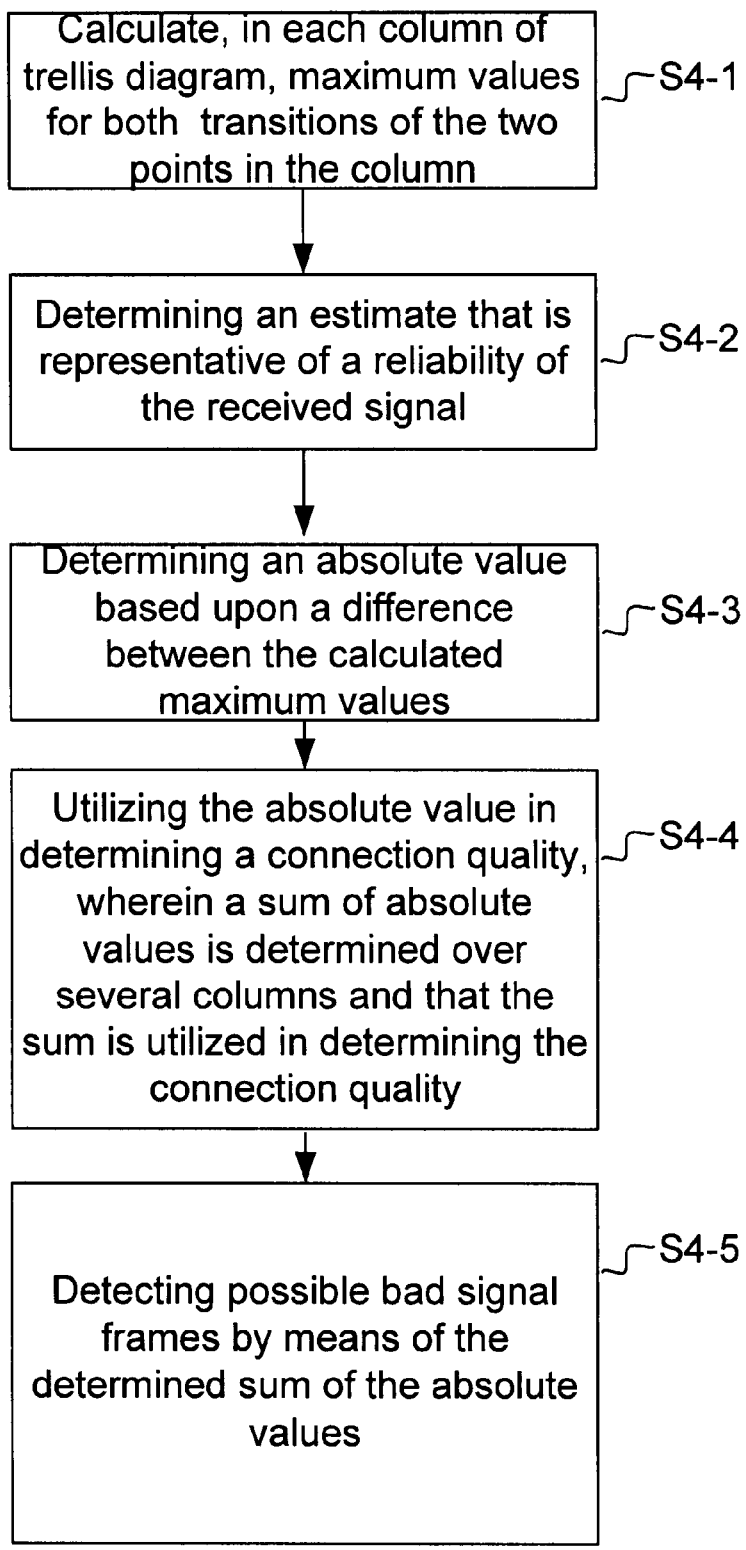
FIG. 4 is a flowchart of a method for determining connection quality according to an embodiment of the invention.

FIG. 4 is a diagram illustrating determining connection quality according to an embodiment of the invention. At step S4-1, decoder 214 calculates, in each column of the trellis diagram, maximum values for both transitions of the two points in the column. At step S4-2, decoder 214 determines an estimate that is representative of a reliability of the received signal. At step S4-3, decoder 214 determines an absolute value based upon a difference between the calculated maximum values. Next, at step S4-4, decoder 214 utilizes the absolute value in determining a connection quality wherein a sum of absolute values is determined over several columns and the sum is utilized in determining the connection quality. At step S4-5, decoder 214 detects possible bad signal frames by means of the determined sum of the absolute values.

Although the invention is in the above described with reference to the example in the accompanying drawings, it is obvious that the invention is not restricted thereto but may vary in many ways within the inventive idea of the claims.

What is claimed is:

1. A method for estimating connection quality in a receiver of a radio system, whereby decoding a received signal with a Viterbi decoder utilizes a trellis diagram comprising a group of state points, transitions being possible from each point of the trellis diagram to two points in the next column of the trellis diagram, and state transition values being calculated for the transitions, the method comprising:

calculating, in each column of the trellis diagram, maximum values for both transitions of the two points in the column;

determining an estimate that is representative of a reliability of the received signal;

determining an absolute value based upon a difference between the calculated maximum values, and utilizing said absolute value in determining a connection quality, wherein a sum of absolute values is determined over several columns and that the sum is utilized in determining the connection quality.

2. A method as claimed in claim 1, wherein possible bad signal frames are detected by means of the determined sum of said absolute values.

3. A method as claimed in claim 1 wherein the state transitions value in each point correspond to bit alternatives 0 and bit alternatives 1, and that when determining the difference between the calculated maximum values, a maximum value of the bit alternatives 0 is subtracted from a maximum value of the bit alternatives 1.

4. A receiver in a radio system to decode a received signal by a Viterbi method by means of a trellis diagram comprising a group of state points, and means for calculating state transition values for two possible transitions in each point of the trellis diagram, the receiver comprising:

means for calculating, in each column of the trellis diagram, maximum values for both of the two possible transitions in each point in the column of the trellis diagram;

means for determining an estimate that is representative of a reliability of the received signal;

means for determining an absolute value based upon a difference between the calculated maximum values; and means for estimating connection quality by utilizing said absolute value, wherein a sum of absolute values over several columns is determined and the sum is utilized to determine the connection quality.

5. A receiver as claimed in claim 4, further comprising means for detecting possible bad signal frames by means of the determined sum of said absolute values.

* * * * *